Figure 1:
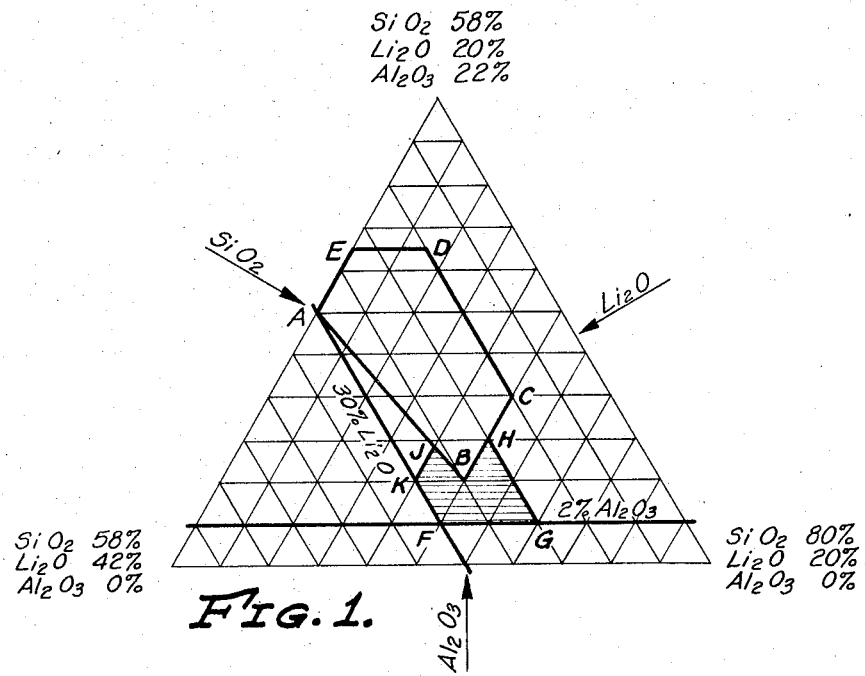

United States Patent

Arthur et al.

[11] 3,862,016
[45] Jan. 21, 1975

[54] METHOD OF MEASURING SODIUM ION CONCENTRATION

[75] Inventors: Edwin P. Arthur, Fullerton; Robert W. Nolan, Altadena, both of Calif.

[73] Assignee: Beckman Instruments, Inc., Fullerton, Calif.

[22] Filed: Feb. 28, 1972

[21] Appl. No.: 230,144

Related U.S. Application Data

[63] Continuation of Ser. No. 62,484, Oct. 13, 1960, abandoned, and a continuation-in-part of Ser. No. 106, Jan. 4, 1960, abandoned, which is a continuation-in-part of Ser. No. 813,895, May 18, 1959, abandoned.

[52] U.S. Cl. .............................. 204/1 T, 204/195 G
[51] Int. Cl. ............................................ G01n 27/36
[58] Field of Search ........................ 204/1 T, 195 G

[56] References Cited
OTHER PUBLICATIONS

Eisenman et al., "Science," Vol. 126, Oct. 25, 1957, pp. 831–834.
Tendeloo et al., "Recueil des Travaux des Pays Bas," Vol. 61, 1942, pp. 531–538.

*Primary Examiner*—T. Tung
*Attorney, Agent, or Firm*—Robert J. Steinmeyer; John G. Mesaros

[57] ABSTRACT

A Na+ sensitive—K+ insensitive glass electrode utilizing a conductive membrane of lithia, alumina and silica is disclosed and the method of using it to detect sodium ions in an aqueous liquid containing potassium ions.

2 Claims, 2 Drawing Figures

PATENTED JAN 21 1975　　　　　　　　　　　　　3,862,016

INVENTORS
EDWIN P. ARTHUR,
ROBERT W. NOLAN
BY THEIR ATTORNEYS
HARRIS, KIECH, RUSSELL & KERN

METHOD OF MEASURING SODIUM ION CONCENTRATION

This is a continuation of copending application Ser. No. 62,484, filed Oct. 13, 1960, now abandoned, which is a continuation-in-part of now abandoned application Ser. No. 106, filed Jan. 4, 1960, which is a continuation-in-part of now abandoned application Ser. No. 813,895, filed May 18, 1959.

This invention relates to the measurement of alkali ion concentration and, in particular, to sodium ion concentration. Specifically, the invention relates to glass electrode membranes of lithia-alumina-silica composition and their use in the measurement of alkali ion concentration generally and sodium ion selectivity in particular.

The electrodes of the invention are useful in general analytical work since sodium and potassium are elements of widespread occurrence. The electrodes are especially valuable in various biological studies, including studies of body fluids, and in food and soil analysis.

Sodium ion concentration may be measured by substituting the glass electrode of the present invention for the hydrogen ion sensitive glass electrode of a conventional pH meter. The U.S. patent to Eisenman, et al., U.S. Pat. No. 2,829,090 discloses a glass electrode that can be used for measuring sodium ion concentration, which electrode uses a soda-alumina-silica glass wherein the ratio of the mole percent of alumina to soda is at least 1 to 1. However, the soda-alumina-silica glass electrodes are not sufficiently selective in their response for many applications and are relatively difficult to form into suitable membranes. Accordingly, it is an object of the present invention to provide a new and improved glass electrode for measurement of alkali ion concentration and, in particular, sodium ion concentration, which electrode is formed of a glass that is easy to work and which produces a membrane of high selective sensitivity to sodium ion. In addition to the required ion selectivity and the workability, a glass electrode composition that is commercially satisfactory must have a useful ion response curve, proper aging, softening point, viscosity, resistivity, and thermal expansion characteristics. The electrode glass must also be resistant to devitrification, must have low solubility in water and high mechanical strength, and must perform adequately under various environmental conditions such as strong acid solutions, strong alkali solutions, and high temperature solutions.

It has been unexpectedly found that a glass electrode membrane can be made of lithia-alumina-silica composition wherein the lithia exceeds the alumina in mole per cent and that such a composition is most desirable for measurement of sodium ion concentration, being capable of unprecedented selectivity of response to sodium ion, i.e., sodium ion (Na+) sensitive and potassium ion (K+) insensitive, while at the same time being more easily worked and of lower viscosity than electrodes previously proposed for such use. Within certain ranges of composition the electrodes of the invention are independently useful for combined alkali ion measurement, e.g., combined sodium and potassium ion, or by the use of appropriate techniques, the measurement of potassium ion only.

Figure 2:
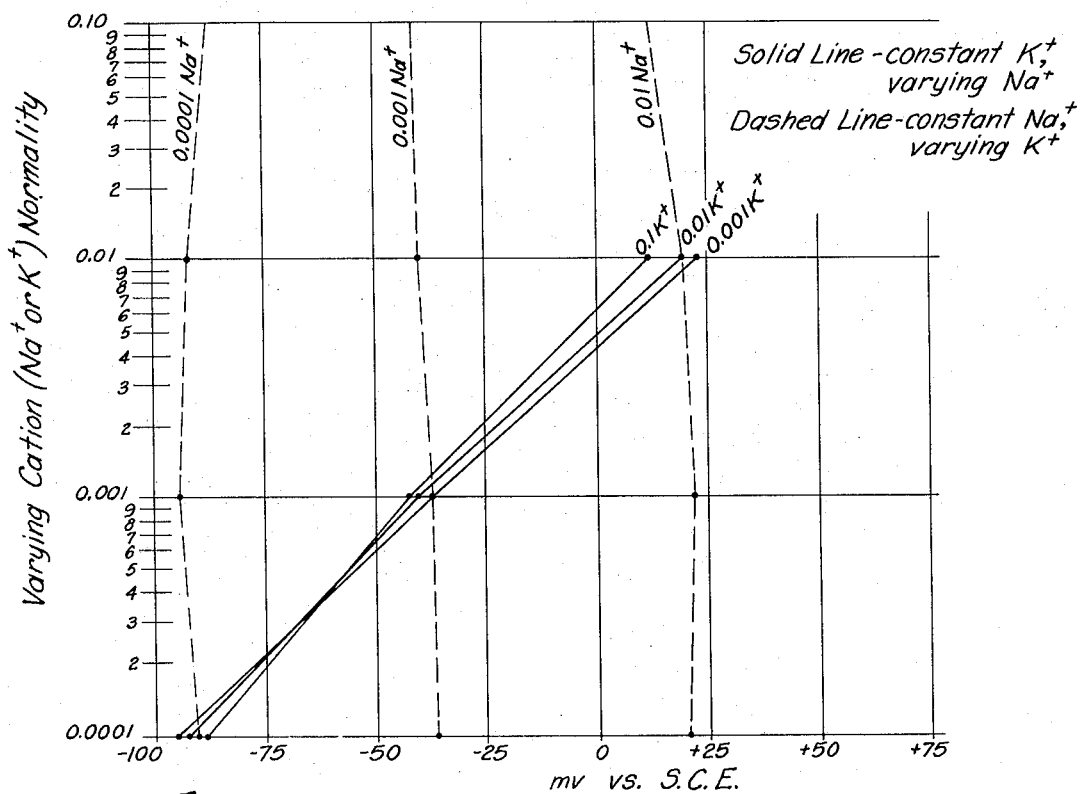

In the drawing,

FIG. 1 is a portion of a triaxial phase diagram in mole percent in which the upper apex represents a glass comprising 58 percent silica, 20 percent lithia and 22 percent alumina, the left apex represents a glass comprising 58 percent silica, 42 percent lithia and 0 percent alumina, and the right apex represents a glass comprising 80 percent silica, 20 percent lithia and 0 percent alumina, with the lines of the diagram spaced at 2 mole percent, and FIG. 2 is a graph illustrating the response of a preferred embodiment of the invention.

Referring to the triaxial phase diagram of the drawing, it has been found that electrodes having membranes of lithia-alumina-silica glass in the region of greater than 2 mole percent $Al_2O_3$ and less than 30 mole percent $Li_2O$ are generally suitable for measurement of alkali ion concentration. The highest selectivity of response to sodium ion is found in glasses from the area ABCDE defined by the 12 $Al_2O_3$ — 30 $Li_2O$ point, the 4 $Al_2O_3$ — 28 $Li_2O$ point, the 8 $Al_2O_3$ — 24 $Li_2O$ point, the 15 $Al_2O_3$ — 24 $Li_2O$ point, and the 15 $Al_2O_3$ — 27 $Li_2O$ point. Electrode membranes formed from glasses falling within this area may be used for measuring sodium ion concentration in solutions having high potassium ion concentration. A suitable composition and one having high selectivity of sodium ion over hydrogen ion and potassium ion is about 27 mole percent $Li_2O$, 6 mole percent $Al_2O_3$, and the balance $SiO_2$. In a more refractory glass also having high selectivity the ratio of alumina to silica may be doubled, i.e., about 25.5 mole per cent $Li_2O$, 14 mole per cent $Al_2O_3$, and 60.5 mole per cent $SiO_2$.

The glass composition of the invention is used to make the bulb or membrane of a glass electrode using conventional techniques such as that disclosed in the U.S. patent to Cary, et al., U.S. Pat. No. 2,346,470 or other processes known in the art. In making the glass, the three constituents may be mixed in the oxide form in appropriate quantities to provide the desired result. However, as lithium oxide is difficult to handle and alumina is highly refractory, other forms are preferred as the starting materials. It has been found that aluminum nitrate hydrated crystals may be used as a starting material for the aluminum constituent to produce a satisfactory lithia-alumina-silica glass. Alternatively, aluminum hydroxide (dried gel) may be used. A volatile lithium salt such as lithium carbonate is a preferred starting material for the lithia. Silica is the ordinary starting material for the silicon constituent. In terms of these materials the desired pre-fusion mixture for the first mentioned glass of high selectivity toward sodium ion comprises silica sand, lithium carbonate and aluminum nitrate hydrated crystals in parts by weight of about 40, 20 and 45, respectively. A pre-fusion mixture which produces the more refractory glass comprises silica sand, lithium carbonate and aluminum hydroxide (dried gel) in parts by weight of about 114, 60 and 78, respectively.

The above-described pre-fusion mixtures produce aluminum oxide which immediately goes into solution in the melt so as to produce a glass at an achievable working temeprature. The pre-fusion lithium and aluminum constituents decompose on heating leaving lithia and alumina. The other decomposition products are volatile and are substantially or completely boiled away.

The selectivity of an electrode toward a first ion in the presence of a second ion may be measured by the response of the electrode toward varying concentrations of the first ion, the second ion being also present in widely varying amounts. An ideal electrode would exhibit ideal "Nernstian response," i.e., at 25° C. would show always a 59.16 millivolts change per tenfold change of concentration of the first ion, regardless of background amounts of potentially interfering ions. The merit of the invention in providing glasses selectively sensitive to sodium ion in the presence of potassium ion is illustrated in FIG. 2. This graph shows the data for the actual millivolt response of the lithia-alumina-silica glass (25.5 mole per cent $Li_2O$, 14 mole per cent $Al_2O_3$, 60.5 mole per cent $SiO_2$). The samples comprised solutions of mixtures of sodium and potassium ions. The chloride salts were used and all solutions were adjusted above pH 8 by addition of barium hydroxide. Each point represents the arithmetic mean of several measurements with three different electrodes with the solution at 22° C.

The data in FIG. 2 are plotted in two different ways: (1) as sodium response in the presence of three constant levels of potassium (solid lines), and (2) as potassium response with three constant levels of sodium (dashed lines). The sodium curves (solid lines) show the theoretical Nernst slope from 0.01 to 0.001 N sodium in the presence of both 0.01 and 0.001 N potassium. When 0.1 N potassium was present the response over this decade dropped to 96 percent of the theoretical Nernst value; however, this is very good performance when one realizes that the potassium level was 10 to 100 times that of the sodium. In the next decade (0.001 to 0.0001 N sodium) the response dropped off a potassium increased. The potassium response curves (dashed lines) show the electrodes to be nonresponsive to potassium ion except at the 0.0001 N sodium level, where a small difference of 7 mv was measured from 0.1 to 0.01 N potassium. This is only 0.26 of the expected Nernst response over a decade where the potassium exceeded the sodium from 100 to 1,000-fold in concentration.

To demonstrate the selectivity somewhat differently, we may consider in given instances what the electrode response would have been if the electrode were equally sensitive to sodium and potassium. When, for example, measuring two solutions containing respectively 0.01 N and 0.001 N sodium ion, both having 0.01 N potassium ion, the total respective normalities would be 0.02 and 0.011 N. An electrode indifferently responsive to sodium and potassium ion would here show only 0.26 of the Nernstian potential change expected for response to sodium ion only. Actually, as shown in the data, full Nernstian response was obtained in this case.

The compositions in the zone ABCDE are easily worked, have a desirable low impedance, and have the selective response exemplified by the data of FIG. 2. As increase in $Li_2O$ toward the 30 percent line and a decrease in $Al_2O_3$ toward the 2 percent line produces glasses which, while being sensitive to sodium ion, are also sensitive to potassium ion. In particular, glasses of the invention falling in the area JKFGHB in FIG. 1 are suitable for measuring sodium ion concentration in solutions where potassium ion is known to be absent or is present in very small amount, or may be used for measuring total sodium and potassium ion concentration. By use of an appropriate auxiliary electrode, or by a supplementary measurement, such electrodes may also be used to determine potassium ion per se in a mixture of sodium and potassium ions. For example, a first measurement may be made with an electrode responsive substantially to the sodium ion only, and a separate measurement made by an electrode responsive to both the sodium and potassium. By subtraction of the signals or by a related calculation the response due to the potassium alone could then be determined. Alternatively, two suitable electrodes, one of the sodium responsive type and one of the sodium-potassium responsive type, could be immersed simultaneously in the solution and a different type of measurement made to give a direct potassium ion reading. As compared with compositions described by Eisenman et al in U.S. Pat. No. 2,829,090, responsive to sodium and potassium, the dual-responsive compositions of the invention have the important advantage, for comparable response, of far easier workability, i.e., much lower viscosity and softening points.

The compositions with less than 2 percent $Al_2O_3$ and more than 30 percent $Li_2O$ do not make satisfactory glasses. As the amount of $Al_2O_3$ increases over that defined in the area ABCDE, the composition becomes very refractory and the glass is difficult to work. With such convenient equipment as is conventionally used in the glass electrode art, we have not been able to melt mixtures where the alumina to lithia mole percent ratio substantially exceeds 1:2.

The electrode glasses of the invention exhibit some sensitivity to hydrogen ion. Therefore, in order to obtain optimum performance in solutions where the pH is less than 8, a suitable alkalizing reagent, such as barium hydroxide, may be added to the solution to raise the pH to 8 or higher.

The following tabulation sets out comparative data on the glass of the present invention and the optimum glass $NAS_{11-18}$ of the aforesaid patent to Eisenman, et al., U.S. Pat. No. 2,829,090, showing the superior performance and physical characteristics of the glass of the present invention:

|  | NAS 11-18 | LAS 25.5-14 |
|---|---|---|
| Resistivity 11 mm. dia. bulbs | about 100 magohms * | 80 megohms |
| Melting temperature | apparently over 1800° C. ** | approximately 1500° C. |
| Softening temperature | approximately 1700° C. | approximately 1150° C. |
| Selectivity of response by Eisenman criterion | 268* | 950 |

* data from Eisenman patent
** did not melt at melting point of platinum crucible Composition with a greater proportion of lithia to alumina have a lower resistivity, melting point and selectivity.

In use for the measurement of ion concentration of a liquid, the glass electrode of the invention and a standard reference half-cell are inserted into the liquid and the two electrodes are connected to the input of a high impedance amplifier such as is used on conventional pH measurements. Thus, in measurement of sodium ion, the equipment may be calibrated to read directly in pNa by using standard solutions of known concentration as in pH measuring techniques.

Response of the electrodes of the invention to lithium ion does not present a problem since, first, lithium is not normally encountered in most applications where sodium and/or potassium ion is to be measured, and, second, the actual response of the electrodes to lithium ion has been found to be appreciably lower than to sodium or potassium ion.

In the manufacture of the glass of the invention, small quantities of volatile salts and other materials, such as vitreous colors and colloidal metals may be included in the starting mixture as an additive. Materials such as nitrates, chlorides, hydrates, silico fluorides, arsenic oxide and antimony oxide, are conventionally used as fluxes in facilitating fusion in glass making. These materials decompose and volatize during the heating and ordinarily only a small portion, if any, of the initial quantity remains in the finished glass. The boiling off of the volatile materials may also provide a stirring of the melt. The vitreous colors and colloidal metals ordinarily remain in the finished glass and may be used for identification purposes.

Only a few mole percent of the additives discussed in the preceding paragraph will be used in the glass, the normal range being from 0 to about 4 mole percent. The proportion in the finished glass usually will be lower, as ordinarily at least a portion of the additive is boiled away. Hence, the mixtures as indicated by FIG. 1 may include a few mole percent of one or more additives and reference in the specification and claims to a glass essentially of lithia-alumina-silica composition is not intended to exclude the presence of such additives in the glass.

We claim:

1. A method of measuring sodium ion concentration in a liquid also containing potassium ions comprising the steps of: contacting the liquid with a membrane of a glass electrode which membrane is essentially a lithia-alumina-silica glass of a composition falling within the area ABCDE of FIG. 1; contacting the liquid with a reference half-cell; and determining the potential developed between the glass electrode and the reference half-cell as a measure of the sodium ion concentration in the liquid.

2. A method of measuring sodium ion concentration in a liquid also containing potassium ions comprising the steps of: contacting the liquid with a membrane of a glass electrode which membrane is essentially a lithia-alumina-silica glass comprising $Li_2O$ in the range of about 24 to 30 mole per cent, $Al_2O_3$ in the range of about 4 to 15 mole per cent, $SiO_2$ in the range of about 58 to 68 mole per cent, and zero to a few mole per cent of glass making additive; contacting the liquid with a reference half-cell; and determining the potential developed between the glass electrode and the reference half-cell as a measure of the sodium ion concentration in the liquid.

* * * * *